United States Patent Office 3,365,473
Patented Jan. 23, 1968

3,365,473
13β-LOWER ALKYL GONA-4,8(14)-DIEN-3-ONES 17β PROCESS FOR THE PRODUCTION THEREOF
David Taub, Metuchen, N.J., assignor to Merck & Co., Inc., Rahway, N.J., a corporation of New Jersey
No Drawing. Filed Dec. 28, 1965, Ser. No. 517,128
15 Claims. (Cl. 260—397.3)

ABSTRACT OF THE DISCLOSURE

This invention disclosed herein is concerned with a novel synthesis of novel intermediate compounds useful in the synthesis of known steroids of the estrane series which have utility in the pharmaceutical field as gonadotrophin inhibiting agents and which also have progestational activity. More particularly, this invention relates to a synthesis of 13β-lower alkylgona-4,8(14)-dien-3-one-17β-ol or 17-keto steroids (Compound III), 3-hydroxy-13β-lower alkylgona-1,3,5(10),8(14)-tetraen-17β-ol, or 17β-keto, 17-acetal or ketal steroids (Compound IV). In this synthesis, 3-alkoxy-17β-lower alkyl-gona-1,3,5(10),8,14-pentaen-17β-ol is reacted with lithium and liquid ammonia thereby forming 3 alkoxy-13β-lower alkyl gona 2,5 (10),8(14)-triene-17β-ol which, upon acidic hydrolysis, is converted to the corresponding 3-keto Δ⁴-derivative; the latter compound is reacted with N-bromo-succinimide thereby aromatizing ring A to form 8(14)-dehydroestradiol or other 13-alkyl analog; catalytic hydrogenation of the last-named compound produces 8-iso estradiol or other 13-alkyl analog which is reacted with an etherifying agent to from the corresponding 3-alkyl ether; sodium dichromate oxidation of the latter forms 8-isoestrone 3-alkyl ether which is reacted with chloranil to form the corresponding 3-alkyl ether of 8-dehydroestrone; this compound is then reacted with sodium in liquid ammonia thereby reducing the Δ⁸-bond to form the 3-alkyl ether of estradiol which upon oxidation with chromic acid solution is converted estrone 3-alkyl ether.

This novel synthesis of this invention, in which the starting material is a 3-hydroxy or substituted oxy-13β-lower alkylgona-2,5(10),8(14)-trien-17β-ol, 17-keto, or 17-acetal or ketal (Compound II), may be schematically represented as follows, wherein $R_1$ is hydrogen, a lower alkyl or cycloaliphatic substituent, preferably having not more than five carbon atoms, or a heterocylic substituent, such as a tetrahydropyranyl group; $R_2$ is a β-hydroxy, keto, acetal or ketal group, preferably a 17,17-ethylenedioxy group, $R_3$ is a lower alkyl group, preferably having not more than five carbon atoms; $R_4$ is a β-hydroxy, acetal, or ketal group; and $R_5$ is a β-hydroxy or keto group:

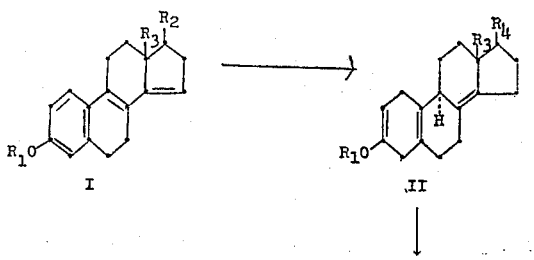

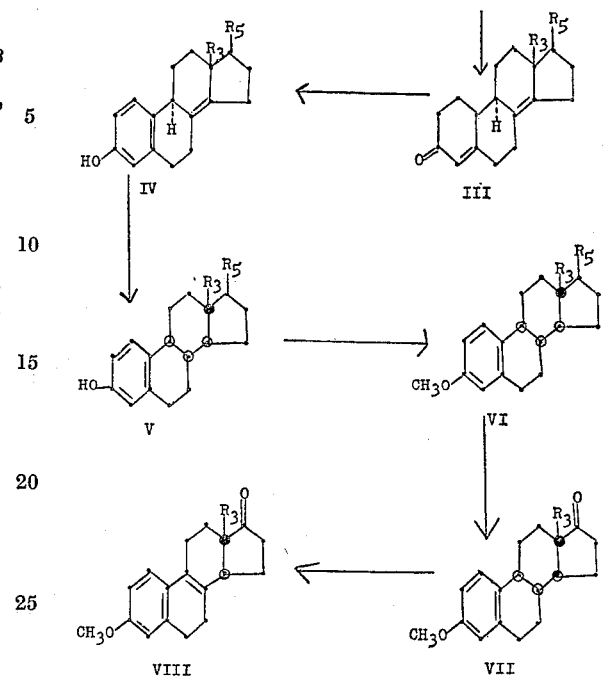

The starting material, Compound II, may be prepared by the reduction of a 3-hydroxy or substituted oxy-17β-lower alkyl-1,3,5(10),8,14-pentaen-17β-ol, 17-keto, or 17-acetal or ketal (Compound I) with an alkali metal, preferably lithium, in liquid ammonia. The reduction is accomplished by adding a solution of Compound I in a suitable solvent, such as a mixture of tetrahydrofuran and ether, to liquid ammonia, which is maintained at a temperature of from about —50° to —60° C. Anhydrous lower aliphatic alcohol is added with vigorous stirring to a solution in liquid ammonia and after the addition is complete, alkali metal is gradually added in small portions. The reaction mixture is allowed to stand for a few minutes and then an additional amount of lower aliphatic alcohol is added. The temperature of the reaction mixture is allowed to come slowly to room temperature and the ammonia is allowed to evaporate. Water is added to the residue and most of the lower aliphatic alcohol is removed from the reaction mixture of distillation under reduced pressure. The concentrate is extracted with a suitable solvent, such as chloroform, the extract is washed with saturated aqueous sodium chloride solution, dried over magnesium sulfate, filtered, and concentrated to dryness under reduced pressure. The residue of Compound II may be recrystallized from a suitable solvent, such as methanol or a methanol water solution.

The 17β-hydroxy group of Compound II may be oxidized to a keto group by oxidation with chromium trioxide in pyridine solution. The chromium trioxide in pyridine solution is added to a pyridine solution of the compound to be oxidized. Oxidation may also be accomplished by adding a solution of the compound to be oxidized in a solvent, such as dry benzene or toluene, containing freshly distilled aluminum is propoxide, allowing the solution to stand under nitrogen for a few minutes and then adding cyclohexanone, followed by heating the reaction mixture on a steam bath.

The first step in the synthesis is the treatment of a solution of Compound II in an organic solvent, preferably acetic acid, with a strong acid, such as hydrochloric, sulfuric, or phosporic acid, at an elevated temperature to provide Compound III. Treatment of Compound II with a strong acid at an elevated temperature, preferably 70° to 90° C., converts a 17-acetal or ketal group to a 17-keto group and simultaneously converts the enol or enol ether linkage on the A-ring to a 3-keto group. The first step in the synthesis may be accomplished by heating a solution of Compound II in acetic acid containing a strong mineral acid, preferably hydrochloric acid, at a temperature of about 90° C. for a few minutes, the reaction mixture being kept under nitrogen during the heating period. After the heating period, the mixture is cooled, poured into ice water, and the resulting mixture is extracted with a suitable solvent, such as ether or chloroform. The extract is washed with 5% aqueous potassium bicarbonate solution, and then washed with saturated aqueous sodium chloride solution. The washed extract is dried over magnesium sulfate, filtered, and concentrated to dryness under reduced pressure. The residue may be crystallized from a suitable solvent, such as methanol.

The second step in the synthesis is the aromatization of the A-ring of Compound III to provide Compound IV The aromatization of the A-ring of Compound III may be accomplished by refluxing a mixture of Compound III and N-bromosuccinimide in a suitable organic solvent such as carbon tetrachloride, under nitrogen. During part of the reflux period, the reaction mixture is illuminated with a photo flood lamp. After refluxing, the reaction mixture is cooled, washed with 5% aqueous potassium bicarbonate solution, dried over magnesium sulfate, filtered, and concentrated to dryness under reduced pressure. The residue may be purified by chromatography on silica gel, using benzene as a solvent and recovering the chromatographed product by elution with a solvent composed of 90% chloroform and 10% methanol. The product may be further purified by crystallization from a suitable solvent, such as methanol.

Compound IV may be used in a synthesis of $13\beta$-lower alkylgona-1,3,5(10)-trien-17-one-3-ol steroids, such as estrone and lower alkyl ethers thereof. The first step in this synthesis is catalytic hydrogenation of Compound IV to provide a 3-hydroxy-13$\beta$-lower alkyl-8-isogona-1,3,5-(10)-trien-17$\beta$-ol or 17-keto steroid (Compound IV). Hydrogenation of Compound IV is conveniently accomplished by shaking a 95% ethanol solution of Compound IV containing 10% palladized charcoal under one atmosphere of hydrogen and at room temperature until an equimolar amount of hydrogen is absorbed. Compound V may be isolated from the reaction mixture by removing the catalyst by filtration and removing the solvent by distillation under reduced pressure. The residue is Compound V and may be purified by crystallization from a suitable solvent, such as methanol.

In the next step, the 3-hydroxy group of Compound V is etherified. Etherification of Compound V, which has a 17$\beta$-hydroxy or a 17-keto group to provide the methyl ether of a 3-hydroxy-13$\beta$-lower alkyl-8-isogona-1,3,5(10)-trien-17$\beta$-ol or 17-one steroid, (Compound VI), may be conveniently accomplished by refluxing an ethanol solution of Compound V containing dimethylsulfate and a strong inorganic base, such as potassium hydroxide or sodium hydroxide. The methyl ether may be conveniently isolated by pouring the reaction mixture into water, extracting with ether, washing the ether extract with dilute aqueous potassium hydroxide solution, then washing with water, drying the ether extract over magnesium sulfate, filtering and removing the solvent by distillation under reduced pressure. The residue of Compound VI may be crystallized from a suitable solvent, such as methanol.

If Compound VI has a 17$\beta$-hydroxy group, it may be oxidized to provide a 3-methyl ether of 3-hydroxy-13-lower alkyl-8-isogona - 1,3,5(10)-trien-17-one steroid (Compound VII). Oxidation of the 17$\beta$-hydroxy group of Compound VI may be accomplished by conventional methods, such as by oxidation with sodium dichromate in acetic acid solution. Oxidation may also be accomplished by adding a solution of the compound to be oxidized in a solvent, such as dry benzene or toluene, containing freshly distilled aluminum isopropoxide, allowing the solution to stand under nitrogen for a few minutes and then adding cyclohexanone, followed by heating the reaction mixture on a steam bath.

Compound VII is oxidized to provide a 3-methyl ether of 3-hydroxy-13-lower alkylgona-1,3,5(10), 8-tetraen-17-one steroid (Compound VIII). Oxidation is accomplished by refluxing under nitrogen a solution of Compound VII in a lower aliphatic alcohol, preferably tertiary-butanol, containing chloranil. The reaction product is isolated by filtering the reaction mixture, removing the solvent by distillation under reduced pressure and dissolving the residue in chloroform. The chloroform solution is allowed to stand overnight and then filtered to remove tetrachlorohydroquinone. This solution is washed repeatedly with water, dried over anhydrous sodium sulfate, filtered, and evaporated to dryness under reduced pressure. The residue is dissolved in methanol and treated with charcoal. The charcoal is removed by filtration and the oxidized product, Compound VIII is crystallized from a suitable solvent, such as methanol or ethyl acetate.

Compound VIII may be converted to the 3-methyl ether of a 3-hydroxy 13-lower alkylgona-1,3,5(10)-trien-17$\beta$-ol steroid by reduction of the $\Delta^8$-bond of Compound VIII with sodium or potassium in liquid ammonia. If a keto group is present on the 17-carbon atom of Compound VIII, reduction with sodium or potassium in liquid ammonia also results in reduction of the 17-keto group to a 17$\beta$-hydroxy group. The 17$\beta$-hydroxy group may be oxidized to a 17-keto group by conventional methods, such as oxidation with concentrated aqueous chromic acid solution or oxidation with aluminum isopropoxide in the presence of cyclohexanone to provide a 3-methyl ether of a 3 - hydroxy - 13-lower alkylgona-1,3,5(10)-trien-17-one steriod.

A 3-hydroxy-13-lower alkylgona-1,3,5(10)-trien-17-one steroid may also be obtained by shifting the $\Delta^8$-bond of Compound VIII to the $\Delta^{9(11)}$-position to provide a 3-methyl ether of a 3-hydroxy-13-lower alkylgona-1,3, 5(10),9(11)-tetraen-17-one steroid and hydrogenating the latter compound. The $\Delta^8$-bond of Compound VIII is shifted to the $\Delta^{9(11)}$-position by refluxing Compound VIII with methanolic hydrochloric acid. The 3-methyl ether of a 3-hydroxy-13-lower alkylgona-1,3, 5(10),9(11)-tetraen-17-one steroid precipitate out upon cooling the reaction mixture and may be recrystallized from a methanol-ethanol solution. The latter compound may be catalytically hydrogenated by shaking a solution thereof in ethanol containing 10% palladized charcoal with hydrogen until one molecular equivalent of hydrogen has been absorbed, filtering, removing the solution by distillation under reduced pressure and crystallizing the residue from a suitable solvent, such as methanol. The hydrogenation product is a 3-hydroxy-13-lower alkylgona-1,3,5(10)-trien-17-one steroid.

The following preparations illustrate methods of preparing the starting material, Compound II.

PREPARATION 1

*3-methoxy-17,17-ethylenedioxyestra-2,5(10),8(14)-triene*

A solution of 1 g. of 3-methoxy-17,17-ethylenedioxy-estra-1,3,5(10),8,14-pentaene in 25 ml. of tetrahydrofuran and 30 ml. of ether is added to 150 ml. of anhydrous liquid ammonia while the temperature of the ammonia is within the range of —50° to —60° C. Eighty milliliters of anhydrous ethanol is added with vigorous stirring and then 4 g. of lithium are added in small pieces over a 10-minute period. The reaction mixture is allowed to stand for 15 minutes and then 10 ml. of ethanol are added. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract is washed with saturated aqueous sodium chloride solution, dried over magnesium sulfate, filtered, and concentrated to dryness under reduced pressure. One gram of crude 3 - methoxy - 17,17 - ethylenedioxyestra-2,5(10),8(14)-triene is obtained. The crude product is purified by crystallization from methanol.

PREPARATION 2

3-methoxy-13β-ethylgona-2,5(10),8(14)-trien-17β-ol

A solution of 1 g. of 3-methoxy-13β-ethylgona-1,3,5-(10),8,14-pentaen-17β-ol in 25 ml. of tetrahydrofuran and 30 ml. of ether is added to 150 ml. of anhydrous liquid ammonia while the temperature of the ammonia is within the range of −50° to −60° C. Eighty milliliters of anhydrous ethanol is added with vigorous stirring and then 4 g. of lithium are added in small pieces over a 10-minute period. The reaction mixture is allowed to stand for 15 minutes and then 10 ml. of ethanol are added. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract washed with saturated aqueous sodium chloride solution, dried over magnesium sulfate, filtered, and concentrated to dryness under reduced pressure. One gram of crude 3-methoxy-13β-ethylgona-2,5(10),8(14)-trien-17β-ol is obtained. The crude product is purified by crystallization from methanol.

PREPARATION 3

3-tetrahydropyranyloxy-13β-isopropylgona-2,5(10),8(14)-trien-17β-ol

A solution of 1 g. of 3-tetrahydropyranyloxy-13β-isopropylgona-1,3,5(10),8,14-pentaen-17β-ol in 25 ml. of tetrahydrofuran and 30 ml. of ether is added to 150 ml. of anhydrous liquid ammonia while the temperature of the ammonia is within the range of −50° to −60° C. Eighty milliliters of anhydrous ethanol is added with vigorous stirring and then 4 g. of lithium are added in small pieces over a 10-minute period. The reaction mixture is allowed to stand for 15 minutes and then 10 ml. of ethanol are added. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract is washed with saturated aqueous sodium chloride solution, dried over magnesium sulfate, filtered, and concentrated to dryness under reduced pressure. One gram of crude 3 - tetrahydropyranyloxy - 13β - isopropylgona-2,5(10),8(14)-trien-17β-ol is obtained. The crude product is purified by crystallization from methanol.

PREPARATION 4

3-ethoxy-13β-n-butylgona-2,5(10),8(14)-trien-17β-ol

A solution of 1 g. of 3-ethoxy-13β-n-butylgona-1,3,5(10),8,14-pentaen-17β-ol is 25 ml. of tetrahydrofuran and 30 ml. of ether is added to 150 ml. of anhydrous liquid ammonia while the temperature of the ammonia is within the range of −50° to −60° C. Eighty milliliters of anhydrous ethanol is added with vigorous stirring and then 4 g. of lithium are added in small pieces over a 10-minute period. The reaction mixture is allowed to stand for 15 minutes and then 10 ml. of ethanol are added. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract is washed with saturated aqueous sodium chloride solution, dried over magnesium sulfate, filtered, and concentrated to dryness under reduced pressure. One gram of crude 3-ethoxy-13β-n-butylgona-2,5(10),8(14)-trien-17β-ol is obtained. The crude product is purified by crystallization from methanol.

The following examples illustrate methods of carrying out the present invention, but it is to be understood that these examples are given for purposes of illustration and not of limitation.

EXAMPLE 1

13β-methylgona-4,8(14)-diene-3,17-dione

A solution of 1 g. of 13β-methyl-17,17-ethylene-dioxygona-2,5(10),8(14)-trien-3-ol methyl ether in 10 ml. of acetic acid and 5 ml. of 1 N-hydrochloric acid is kept under nitrogen at 90° C. for 10 minutes. The mixture is cooled, poured into 100 ml. of iced water, and extracted with chloroform. The extract is separated and washed with 5% aqueous potassium bicarbonate solution, washed with saturated aqueous sodium chloride solution, dried over magnesium sulfate, filtered, and concentrated to dryness under reduced pressure. The residue of 13β-methylgona-4,8(14)-diene-3,17-dione is crystallized from methanol and the recrystallized product has a melting point of 155–158° C. $\lambda_{max}$. 234 mμ ($E_m$ 15,510).

EXAMPLE 2

$\Delta^{8(14)}$-dehydroestrone

A mixture of 270 mg. of 13β-methylgona-4,8(14)-diene-3,17-dione and 200 mg. of N-bromosuccinimide in 30 ml. of carbon tetrachloride is refluxed under nitrogen and illumination with a photo flood lamp for 2 minutes and then refluxed for 5 minutes without illumination. The reaction mixture is cooled, washed with 5% aqueous potassium bicarbonate solution, dried over magnesium sulfate, filtered and concentrated to dryness under reduced pressure. The residue of $\Delta^{8(14)}$-dehydroestrone is purified by chromatography on silica gel, using benzene as a developing solvent and using a solvent composed of 90% chloroform and 10% methanol to elute the $\Delta^{8(14)}$-dehydroestrone from the chromatogram.

EXAMPLE 3

8-isoestrone 0.134 grams of 8(14)-dehydroestrone in solution in 30 ml. of 95% ethanol containing 0.1 g. of 10% palladium on charcoal is hydrogenated at room temperature and atmospheric pressure until one molecular equivalent of hydrogen is absorbed. The catalyst is removed by filtration and the ethanol is removed by distillation under reduced pressure. The residue is 8-isoestrone and is purified by recrystallization from methanol. The recrystallized material has a melting point of 252–254° C. U.V. spectrum (methanol): $\lambda_{max}$. 281 (E 2,160).

EXAMPLE 4

8-isoestrone methyl ether

Three milliliters of dimethylsulfate are added dropwise to a solution of 0.192 g. of 8-isoestrone in 30 ml. of ethanol containing 5 g. of potassium hydroxide and the mixture is refluxed for four hours under nitrogen. The solution is poured into 150 ml. of water and the aqueous solution is extracted with ether. The ether solution is washed with 5% aqueous potassium hydroxide solution then with water until neutral. The ether solution is dried over magnesium sulfate and the ether is removed by distillation under reduced pressure. The residue of 8-isoestrone methyl ether is recrystallized twice from methanol and has a M.P. of 152.5–153.5° C.

*Analysis.*—Calcd. for $C_{13}H_{24}O_2$ (284.32): C, 80.24; H, 8.51. Found: C, 80.25; H, 8.64.

EXAMPLE 5

*8-dehydroestrone methyl ether*

A solution of 0.12 g. of 8-isoestrone methyl ether in solution in 12 ml. of tertiary-butanol containing 0.12 g. of chloranil is refluxed for six hours under nitrogen. The reaction mixture is filtered and the tertiary-butanol is removed by distillation under reduced pressure. The residue is dissolved in chloroform and the chloroform solution is allowed to stand overnight and then filtered to remove the tetrachlorohydroquinone. The filtrate is washed repeatedly with water and the chloroform solution is dried over anhydrous sodium sulfate. The chloroform solution is concentrated to dryness by distillation under reduced pressure. The residue is dissolved in methanol and treated with charcoal. The charcoal is removed by filtration and the 8-dehydroestrone methyl ether is crystallized from the concentrated methanol solution and then from ethyl acetate. The recrystallized product has a M.P. of 121–123° C. U.V. spectrum (dioxane): $\lambda_{max}$. 280 (E 16,000).

EXAMPLE 6

*13β-ethylgona-4,8(14)-dien-17β-ol-3-one*

A solution of 1 g. of 3-methoxy-13β-ethylgona-2,5(10),8(14)-trien-17β-ol in 10 ml. of acetic acid and 5 ml. of 1 N-hydrochloric acid is kept under nitrogen at 90° C. for 10 minutes. The mixture is cooled, poured into 100 ml. of iced water, and extracted with chloroform. The extract is separated and washed with 5% aqueous potassium bicarbonate solution, washed with saturated aqueous sodium chloride solution, dried over magnesium sulfate, filtered, and concentrated to dryness under reduced pressure. The residue of 13β-ethylgona-4,8(14)-dien-17β-ol-3-one is crystallized from methanol.

EXAMPLE 7

*13β-ethylgona-1,3,5(10),8(14)-tetraene-3,17β-diol*

A mixture of 270 mg. of 13β-ethylgona-4,8(14)-dien-17β-ol-3-one and 200 mg. of N-bromosuccinimide in 30 ml. of carbon tetrachloride is refluxed under nitrogen and illumination with a photo flood lamp for 2 minutes and then refluxed for 5 minutes without illumination. The reaction mixture is cooled, washed with 5% aqueous potassium bicarbonate solution, dried over magnesium sulfate, filtered and concentrated to dryness under reduced pressure. The residue of 13β-ethylgona-1,3,5(10),8(14)-tetraene-3,17β-diol is purified by chromatography on silica gel, using benzene as a developing solvent on a solvent composed of 90% chloroform and 10% methanol to elute the 13β-ethylgona-1,3,5(10),8(14)-tetraene-3,17β,diol from the chromatogram.

EXAMPLE 8

*13β-ethyl-8-isogona-1,3,5(10)-triene-3,17β-diol*

0.134 grams of 13β-ethylgona-1,3,5(10),8,(14)-tetraene-3,17β-diol in solution in 30 ml. of 95% ethanol containing 0.1 g. of 10% palladium on charcoal is hydrogenated at room temperature and atmospheric pressure until one molecular equivalent of hydrogen is absorbed. The catalyst is removed by filtration and the ethanol is removed by distillation under reduced pressure. The residue is 13β-ethyl-8-isogona-1,3,5(10)-triene-3,17β-diol, and is purified by recrystallization from ethanol.

EXAMPLE 9

*13β-ethyl-8-isogona-1,3,5(10)-triene-3,17β-diol methyl ether*

Three milliliters of dimethylsulfate are added dropwise to a solution of 0.192 g. of 13β-ethyl-8-isogona-1,3,5(10)-triene-3,17β-diol in 30 ml. of ethanol containing 5 g. of potassium hydroxide and the mixture is refluxed for four hours under nitrogen. The solution is poured into 150 ml. of water and the aqueous solution is extracted with ether. The ether solution is washed with 5% aqueous potassium hydroxide solution then with water until neutral. The ether solution is dried over magnesium sulfate and the ether is removed by distillation under reduced pressure. The residue of 13β - ethyl - 8 - isogona-1,3,5(10)-triene-3,17β-diol methyl ether is recrystallized twice from methanol.

EXAMPLE 10

*13β-ethyl-8-isogona-1,3,5(10)-trien-3-ol-17-one methyl ether*

A solution of 282 mg. of 13β-ethyl-8-isogona-1,3,5(10)-triene-3,17-diol methyl ether and 99 mg. of sodium dichromate and 10 ml. of glacial acetic acid is kept at 25° C. for six hours. Water is added and the reaction mixture is extracted with chloroform. The chloroform extract is washed with 5% aqueous potassium bicarbonate solution, washed with saturated aqueous sodium chloride solution, dried over magnesium sulfate, filtered and concentrated to dryness under reduced pressure. The residue is 13β-ethyl-8-isogona-1,3,5(10)-trien-3-ol - 17 - one methyl ether and is obtained in crystalline form by trituration with methanol. The product may be recrystallized from methanol.

EXAMPLE 11

*13β-ethylgona-1,3,5(10),8-tetraen-3-ol-17-one methyl ether*

A solution of 0.12 g. of 13β-ethyl-8-isogona-1,3,5(10)-trien-3-ol-17-one methyl ether in solution in 12 ml. of tertiary-butanol containing 0.12 g. of chloranil is refluxed for six hours under nitrogen. The reaction mixture is filtered and the tertiary butanol is removed by distillation under reduced pressure. The residue is dissolved in chloroform and the chloroform solution is allowed to stand overnight and then filtered to remove the tetrachlorohydroquinone. The filtrate is washed repeatedly with water and the chloroform solution is dried over anhydrous sodium sulfate. The chloroform solution is concentrated to dryness by distillation under reduced pressure. The residue is dissolved in methanol and treated with charcoal. The charcoal is removed by filtration and the 13β-ethylgona-1,3,5(10),8-tetraen-3 - ol - 17 - one methyl ether is crystallized from the concentrated methanol solution and then from ethyl acetate.

EXAMPLE 12

*13-β-isopropylgona-4,8(14)-diene-17β-hydroxy-3-one*

A solution of 1 g. of 3-tetrahydropyranyloxy-13β-isopropylgona-2,5(10),8(14)-trien-17β-ol in 10 ml. of acetic acid and 5 ml. of 1 N-hydrochloric acid is kept under nitrogen at 90° C. for 10 minutes. The mixture is cooled, poured into 100 ml. of iced water, and extracted with chloroform. The extract is separated and washed with 5% aqueous potassium bicarbonate solution, washed with saturated aqueous sodium chloride solution, dried over magnesium sulfate, filtered, and concentrated to dryness under reduced pressure. The residue of 13β-isopropylgona-4,8(14)-diene-17β-hydroxy - 3 - one is crystallized from methanol.

EXAMPLE 13

*13β-isopropylgona-1,3,5(10),8(14)-tetraene-3,17β-diol*

A mixture of 270 mg. of 13β-isopropylgona-4,8(14)-diene-17β-hydroxy-3-one and 200 mg. of N-bromosuccinimide in 30 ml. of carbon tetrachloride is refluxed under nitrogen and illumination with a photo flood lamp for 2 minutes and then refluxed for 5 minutes without illumination. The reaction mixture is cooled, washed with 5% aqueous potassium bicarbonate solution, dried over magnesium sulfate, filtered and concentrated to dryness under reduced pressure. The residue of 13β- isopropylgona-1,3,5(10),8(14)-tetraene-3,17β-diol is purified by chromatography on silica gel, using benzene as a developing solvent on a solvent composed of 90% chloroform and 10% methanol to elute the 13β-isopropylgona-1,3,5(10),8(14)-tetraene-3,17β-diol from the chromatogram.

EXAMPLE 14

*13β-isopropyl-8-isogona-1,3,5(10)-triene-3,17β-diol*

0.134 grams of 13β-isopropylgona-1,3,5(10),8(14)-tetraene-3,17β-diol in solution in 30 ml. of 95% ethanol containing 0.1 g. of 10% palladium on charcoal is hydrogenated at room temperature and atmospheric pressure until one molecular equivalent of hydrogen is absorbed. The catalyst is removed by filtration and the ethanol is removed by distillation under reduced pressure. The residue is 13β-isopropyl-8-isogona-1,3,5(10)-triene-3,17β-diol and is purified by recrystallization from methanol.

EXAMPLE 15

*3-methoxy-13β-isopropylgona-8-isogona-1,3,5(10)-trien-17β-ol*

Three milliliters of dimethylsulfate are added dropwise to a solution of 0.192 g. of 13β-isopropyl-8-isogona-1,3,-5(10)-triene-3,17β-diol in 30 ml. of ethanol containing 5 g. of potassium hydroxide and the mixture is refluxed for four hours under nitrogen. The solution is poured into 150 ml. of water and the aqueous solution is extracted with ether. The ether solution is washed with 5% aqueous potassium hydroxide solution then with water until neutral. The ether solution is dried over magnesium sulfate and the ether is removed by distillation under reduced pressure. The residue of 3-methoxy-13β-isopropyl-8-isogona-1,3,5(10)-trien-17β-ol is recrystallized twice from methanol.

EXAMPLE 16

*3-methoxy-13β-isopropyl-8-isogona-1,3,5(10)-trien-17-one*

A solution of 282 mg. of 3-methoxy-13β-isopropyl-8-isogona-1,3,5(10)-trien-17β-ol and 99 mg. of sodium dichromate and 10 ml. of glacial acetic acid is kept at 25° C. for six hours. Water is added and the reaction mixture is extracted with chloroform. The chloroform extract is washed with 5% aqueous potassium bicarbonate solution, washed with saturated aqueous sodium chloride solution, dried over magnesium sulfate, filtered and concentrated to dryness under reduced pressure. The residue is 3-methoxy-13β-isopropyl-8-isogona-1,3,5(10)-trien-17-one and is obtained in crystalline form by trituration with methanol. The product may be recrystallized from methanol.

EXAMPLE 17

*3-methoxy-13β-isopropylgona-1,3,5(10),8-tetraen-17-one*

A solution of 0.12 g. of 3-methoxy-13β-isopropyl-8-isogona-1,3,5(10)-trien-17-one in solution in 12 ml. of tertiary-butanol containing 0.12 g. of chloranil is refluxed for six hours under nitrogen. The reaction mixture is filtered and the tertiary-butanol is removed by distillation under reduced pressure. The residue is dissolved in chloroform and the chloroform solution is allowed to stand overnight and then filtered to remove the tetrachlorohydroquinone. The filtrate is washed repeatedly with water and the chloroform solution is dried over anhydrous sodium sulfate. The chloroform solution is concentrated to dryness by distillation under reduced pressure. The residue is dissolved in methanol and treated with charcoal. The charcoal is removed by filtration and the 3-methoxy-13β-isopropylgona-1,3,5(10),8-tetraen-17-one is crystallized from the concentrated methanol solution and then from ethyl acetate.

EXAMPLE 18

*13β-n-butylgona-4,8(14)-diene-17β-hydroxy-3-one*

A solution of 1 g. of 3-ethoxy-13β-n-butylgona-2,5-(10),8(14)-trien-17β-ol in 10 ml. of acetic acid and 5 ml. of 1 N-hydrochloric acid is kept under nitrogen at 90° C. for 10 minutes. The mixture is cooled, poured into 100 ml. of iced water, and extracted with chloroform. The extract is separated and washed with 5% aqueous potassium bicarbonate solution, washed with saturated aqueous sodium chloride solution, dried over magnesium sulfate, filtered, and concentrated to dryness under reduced pressure. The residue of 13β-n-butylgona-4,8(14)-diene-17β-hydroxy-3-one is crystallized from methanol.

EXAMPLE 19

*13β-n-butylgona-1,3,5(10),8(14)-tetraene-3,17β-diol*

A mixture of 270 mg. of 13β-n-butylgona-4,8(14)-diene-17β-hydroxy-3-one and 200 mg. of N-bromosuccinimide in 30 ml. of carbon tetrachloride is refluxed under nitrogen and illumination with a photo flood lamp for 2 minutes and then refluxed for 5 minutes without illumination. The reaction mixture is cooled, washed with 5% aqueous potassium bicarbonate solution, dried over magnesium sulfate, filtered and concentrated to dryness under reduced pressure. The residue of 13β-n-butylgona-1,3,5(10),8(14)-tetraene-3,17β-diol is purified by chromatography on silica gel, using benzene as a delevolping solvent on a solvent composed of 90% chloroform and 10% methanol to elute the 13β-n-butylgona-1,3,5(10),8-(14)-tetraene-3,17β-diol from the chromatogram.

EXAMPLE 20

*13β-n-butyl-8-isogona-1,3,5(10)-triene-3,17β-diol*

0.134 grams of 13β-n-butylgona-1,3,5(10),8(14)-tetraene-3,17β-diol in solution in 30 ml. of 95% ethanol containing 0.1 g. of 10% palladium on charcoal is hydrogenated at room temperature and atmospheric pressure until one molecular equivalent of hydrogen is absorbed. The catalyst is removed by filtration and the ethanol is removed by distillation under reduced pressure. The residue is 13β-n-butyl-8-isogona-1,3,5(10)-triene-3,17β-diol and is purified by recrystallization from ethanol.

EXAMPLE 21

*3-methoxy-13β-n-butyl-8-isogona-1,3,5(10)-trien-17β-ol*

Three mililiters of dimethylsulfate are added dropwise to a solution of 0.192 g. of 13β-n-butyl-8-isogona-1,3,5-(10)-triene-3,17β-diol in 30 ml. of ethanol containing 5 g. of potassium hydroxide and the mixture is refluxed for four hours under nitrogen. The solution is poured into 150 ml. of water and the aqueous solution is extracted with ether. The ether solution is washed with 5% aqueous potassium hydroxide solution then with water until neutral. The ether solution is dried over magnesium sulfate and the ether is removed by distillation under reduced pressure. The residue of 3-methoxy-13β-n-butyl-8-isogona-1,3,5 (10)-trien-17β-ol is recrystallized twice from methanol.

EXAMPLE 22

*3-methoxy-13β-n-butyl-8-isogonal-1,3,5(10)-trien-17-one*

A solution of 282 mg. of 3-methoxy-13β-n-butyl-8-isogona-1,3,5(10)-trien-17β-ol and 99 mg. of sodium dichromate and 10 ml. of glacial acetic acid is kept at 25° C. for six hours. Water is added and the reaction mixture is extracted with chloroform. The chloroform extract is washed with 5% aqueous potassium bicarbonate solution, washed with saturated aqueous sodium chloride solution, dried over magnesium sulfate, filtered and concentrated to dryness under reduced pressure. The residue is 3-methoxy-13β-n-butyl-8-isogona-1,3,5(10)-trien-17-one and is obtained in crystalline form by trituration with methanol. The product may be recrystallized from methanol.

EXAMPLE 23

*3-methoxy-13β-n-butylgona-1,3,5(10),8-tetraen-17-one*

A solution of 0.12 g. of 3-methoxy-13β-n-butyl-8-isogona-1,3,5(10)-trien-17-one in solution in 12 ml. of tertiary-butanol containing 0.12 g. of chloroanil is refluxed for six hours under nitrogen. The reaction mixture is filtered and the tertiary-butanol is removed by distillation under reduced pressure. The residue is dissolved in chloroform and the chloroform solution is allowed to stand overnight and then filtered to remove the tetrachlorohydroquinone. The filtrate is washed repeatedly with water and the chloroform solution is dried over anhydrous sodium sulfate. The chloroform solution is concentrated to dryness by distillation under reduced pressure. The residue is dissolved in methanol and treated with charcoal. The charcoal is removed by filtration and the 3-methoxy-13β-n-butylgona-1,3,5(10),8-tetraen-17-one is crystallized from the concentrated methanol solution and then from ethyl acetate.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of a compound of the formula:

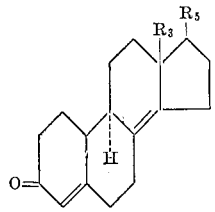

wherein $R_3$ is a lower alkyl radical, and $R_5$ is a β-hydroxy or keto group, which comprises heating with a strong mineral acid at an elevated temperature of approximately 70 to 90° C. a solution in an organic acid solvent of a compound of the formula:

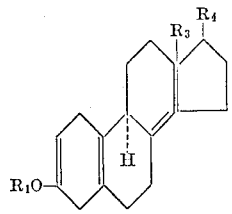

wherein $R_1$ is hydrogen, a lower alkyl, cycloaliphatic, or tetrahydropyranyl substituent, $R_3$ has the same significance as above, and $R_4$ is a β-hydroxy, keto, acetal, or ketal group.

2. A process according to claim 1 in which the organic acid solvent is acetic acid and the strong mineral acid is hydrochloric acid.

3. A process according to claim 1 in which $R_1$ is methyl, $R_3$ is methyl, $R_4$ is a 17,17-ethylenedioxy group, and $R_5$ is a keto group.

4. A process according to claim 1 in which $R_1$ is methyl, $R_3$ is methyl, $R_4$ is a 17,17-ethylenedioxy group, $R_5$ is a keto group, and in which the organic acid solvent is acetic acid and the strong mineral acid is hydrochloric acid.

5. A process for the preparation of a compound of the formula:

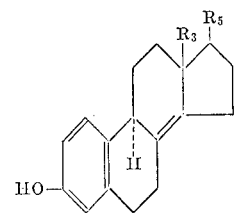

wherein $R_3$ is a lower alkyl radical and $R_5$ is a β-hydroxy or keto group, which comprises refluxing a solution in a halogenated organic solvent containing N-bromosuccinimide of a compound of the formula:

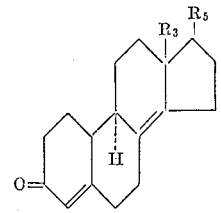

wherein $R_3$ and $R_5$ have the same significance as above.

6. A process according to claim 5 in which $R_3$ is methyl and $R_5$ is a keto group.

7. A process according to claim 5 in which $R_3$ is methyl, $R_5$ is a keto group and the halogenated organic solvent is carbon tetrachloride.

8. A process for the preparation of a compound of the formula:

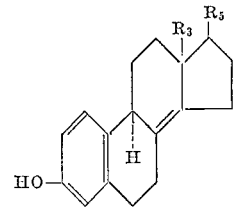

wherein $R_3$ is a lower alkyl radical and $R_5$ is a β-hydroxy or a keto group, which comprises a first step of heating with a strong mineral acid at an elevated temperature of approximately 70 to 90° C. a solution in an organic acid solvent of a compound of the formula:

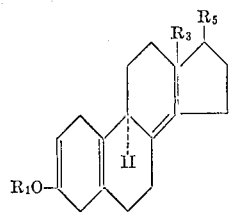

wherein $R_1$ is hydrogen, a lower alkyl, cycloaliphatic, or tetrahydropyranyl substituent, $R_3$ has the same significance as above, and $R_4$ is a β-hydroxy-keto, acetal, or ketal group, to provide a compound of the formula:

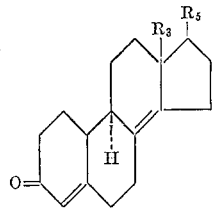

wherein $R_3$ and $R_5$ have the same significance as above, and a second step of refluxing a solution of the latter compound in a halogenated organic solvent containing N-bromosuccinimide.

9. A process according to claim 8 in which $R_1$ is methyl, $R_4$ is a 17,17-ethylenedioxy group, and $R_5$ is a keto group.

10. A process according to claim 8 in which, in the first step, the organic acid solvent is acetic acid and the strong acid is hydrochloric acid, and in the second step, the halogenated organic solvent is carbon tetrachloride.

11. A compound of the formula:

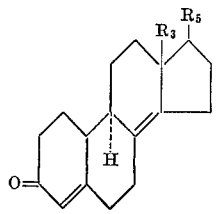

wherein $R_3$ is a lower alkyl radical and $R_5$ is a β-hydroxy or keto group.

12. A compound according to claim 11 in which $R_3$ is methyl and $R_5$ is a keto group.

13. A compound according to claim 11 in which $R_3$ is methyl and $R_5$ is a β-hydroxy group.

14. A compound according to claim 11 in which $R_3$ is ethyl and $R_5$ is a keto group.

15. A compound according to claim 11 in which $R_3$ is ethyl and $R_5$ is a β-hydroxy group.

No references cited.

ELBERT L. ROBERTS, *Primary Examiner.*